United States Patent
Shigeta

(10) Patent No.: US 9,346,506 B2
(45) Date of Patent: May 24, 2016

(54) STRADDLE TYPE VEHICLE

(71) Applicant: SUZUKI MOTOR CORPORATION, Hamamatsu-shi, Shizuoka (JP)

(72) Inventor: Yasuhiro Shigeta, Hamamatsu (JP)

(73) Assignee: SUZUKI MOTOR CORPORATION, Hamamatsu-Shi, Shizuoka (JP)

( * ) Notice: Subject to any disclaimer, the term of this patent is extended or adjusted under 35 U.S.C. 154(b) by 89 days.

(21) Appl. No.: 13/857,350

(22) Filed: Apr. 5, 2013

(65) Prior Publication Data

US 2013/0264368 A1    Oct. 10, 2013

(30) Foreign Application Priority Data

Apr. 5, 2012 (JP) ................................. 2012-086046

(51) Int. Cl.
| | |
|---|---|
| *B62J 9/00* | (2006.01) |
| *B62J 11/00* | (2006.01) |
| *B62J 25/00* | (2006.01) |

(52) U.S. Cl.
CPC .. *B62J 9/001* (2013.01); *B62J 9/00* (2013.01); *B62J 11/00* (2013.01); *B62J 25/00* (2013.01); *B62K 2202/00* (2013.01)

(58) Field of Classification Search
CPC ............ B62J 11/00; B62J 25/00; B62J 9/008; B62J 9/005; B62J 9/00; B62J 9/001
USPC .......... 224/408, 419, 401, 406, 463, 412, 413
See application file for complete search history.

(56) References Cited

U.S. PATENT DOCUMENTS

| | | | | |
|---|---|---|---|---|
| 4,830,134 A | * | 5/1989 | Hashimoto | ................... 180/219 |
| 7,114,739 B2 | * | 10/2006 | Colano | ......................... 280/291 |

FOREIGN PATENT DOCUMENTS

| | | |
|---|---|---|
| EP | 1584550 A2 | 10/2005 |
| JP | S6158179 U | 4/1986 |
| JP | 62031344 Y2 | 8/1987 |
| JP | 2158468 A | 6/1990 |
| JP | 2004-323017 A | 11/2004 |
| JP | 2007-030829 A | 2/2007 |
| JP | 2008201332 A | 9/2008 |

OTHER PUBLICATIONS

Extended European Search Report dated Jul. 4, 2013, which issued during the prosecution of European Patent Application No. 13162313.4.

* cited by examiner

*Primary Examiner* — Adam Waggenspack
*Assistant Examiner* — Matthew Theis
(74) *Attorney, Agent, or Firm* — Troutman Sanders LLP

(57) ABSTRACT

A straddle type vehicle has a seat on which an occupant sits, a pair of right and left footboards provided diagonally below and in front of the seat and allowing the occupant to place his or her feet thereon, and a projecting portion provided between the footboards and projecting upward, wherein an engagement portion for fixing a load mounted on the projecting portion is provided on an upper face side of each of the footboards. The engagement portion for fixing the load is readily visible, and hence workability in operation of mounting and dismounting the load on the vehicle body increases.

8 Claims, 8 Drawing Sheets

STRADDLE TYPE VEHICLE

CROSS-REFERENCE TO RELATED APPLICATIONS

This application is based upon and claims the benefit of priority of the prior Japanese Patent Application No. 2012-086046, filed on Apr. 5, 2012, the entire contents of which are incorporated herein by reference.

BACKGROUND OF THE INVENTION

1. Field of the Invention

The present invention relates to a straddle type vehicle such as a motorcycle and particularly relates to a technology for fixing a load on this straddle type vehicle.

2. Description of the Related Art

Conventionally, on a straddle type vehicle such as a motorcycle for example, a load such as a commercially available external bag may be attached to the vehicle body. As methods for this attachment, there are known a method using a fixing band (see, for example, Patent Document 1), a method using a fastener, and the like.

Further, in a straddle type vehicle having a space in the vicinity of the feet of an occupant, such as a scooter, a load may be mounted on a footboard where the feet of the occupant are placed. For example, Patent Document 2 discloses a structure in which an engagement portion (see "a peg 36 for tying a string") for fixing a load is provided on a side of the footboard for securely fixing a load mounted on the footboard.

[Patent Document 1] Japanese Examined Utility Model Application Publication No. 62-31344

[Patent Document 2] Japanese Laid-open Patent Publication No. 2-158468

However, the footboard is usually disposed at a low position of the vehicle body, and when the engagement portion for fixing a load is provided on the side of the footboard as described above, the operator (for example, the occupant) who performs an operation of mounting or dismounting the load from above cannot easily see the engagement portion. Thus, there is a concern that workability in operation of mounting or dismounting a load on the vehicle body decreases.

SUMMARY OF THE INVENTION

Accordingly, the present invention is made in view of the above-described situation, and has an object to increase workability in operation of mounting or dismounting a load on a vehicle body by making engagement portions for fixing a load easily viewable.

A straddle type vehicle according to the present invention has a seat on which an occupant sits, a pair of right and left footboards provided diagonally below and in front of the seat and allowing the occupant to place his or her feet thereon, and a projecting portion provided between the footboards and projecting upward, wherein an engagement portion for fixing a load mounted on the projecting portion is provided on an upper face side of each of the footboards.

By thus providing the engagement portions for fixing the load to the upper face sides of the footboards, the operator who performs an operation of mounting or dismounting the load from above can easily see the engagement portions, as compared to the case where the engagement portions are provided on sides of the footboards. Thus, workability in operation of mounting or dismounting the load can be increased.

An upper edge of the engagement portion may be disposed at a position which is at a same height as upper faces of the footboards or lower than the upper faces of the footboards.

By employing such a structure, the engagement portions are not exposed above the footboards. Thus, in the case where the engagement portions are not used, or the like, the feet of the occupant wound not be caught on the engagement portions, and the riding comfort of the straddle type vehicle improves.

The engagement portion may be provided to be positioned in the vicinity of the plantar arch of a foot of the occupant in a state that the occupant places the foot on the footboard.

By employing such a structure, contact of the feet of the occupant with the engagement portions is suppressed, and it is possible to alleviate the sense of discomfort during riding.

The engagement portion may be provided on an inside end portion of each of the footboards and may be close to the projecting portion.

By employing such a structure, the engagement portions can be made close to the projecting portion. Accordingly, when a structure is employed in which a fixing member is attached to the tip of each fixing band provided on a load for example and this fixing member is engaged with the engagement portion, the fixing bands run along the projecting portion. Accordingly, the feet of the occupant would not be caught on the fixing bands, and the fixing members and the engagement portions are not pressed down with the feet, which improves the riding comfort.

DETAILED DESCRIPTION OF THE PREFERRED EMBODIMENTS

Hereinafter, preferred embodiments of the present invention will be described based on the drawings. Hereinafter, words indicating directions, such as up and down, right and left, front and rear, and the like are used with reference to the direction seen from occupants 2, 3 (see FIG. 1) of a motorcycle 1. Further, unless particularly specified otherwise, when "outside" is described, it indicates an outside in a right and left direction (vehicle width direction), and when "inside" is described, it indicates an inside in the right and left direction (vehicle width direction). Note that an arrow Fr described appropriately in diagrams indicates the front of the motorcycle 1.

To begin with, the overall structure of the motorcycle 1 as a straddle type vehicle will be described.

Figure 1:
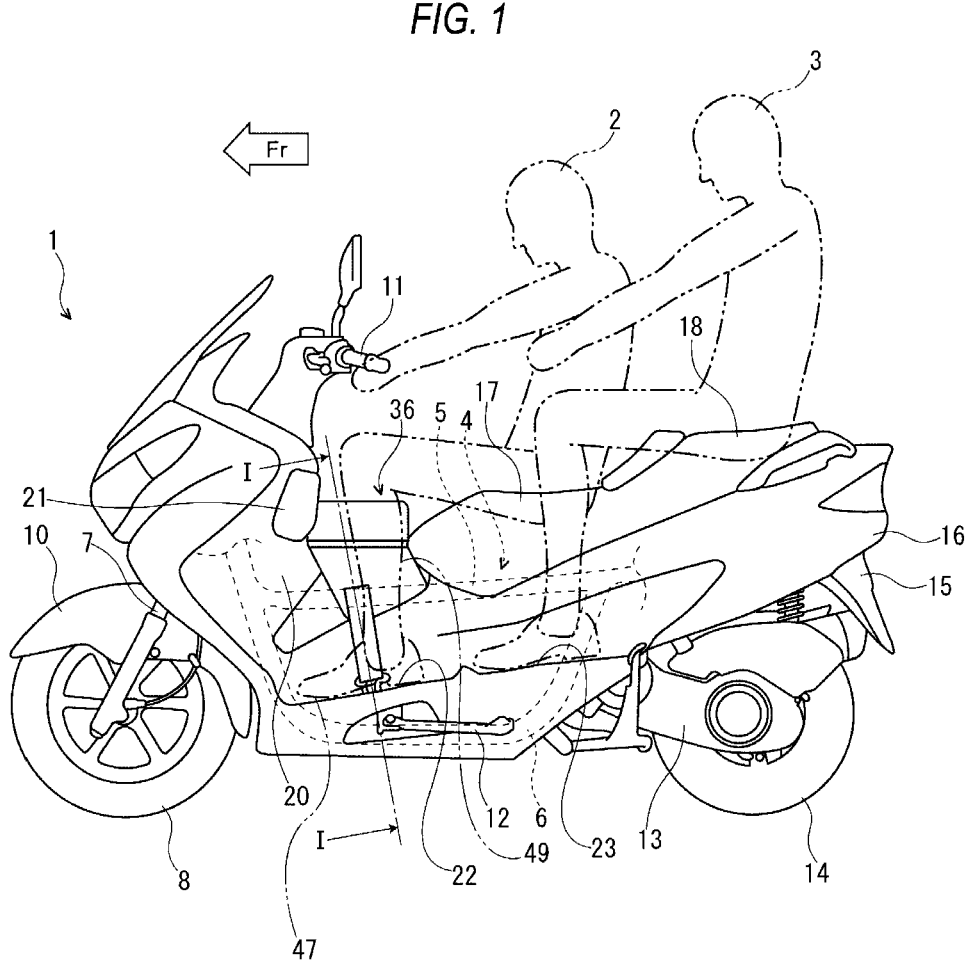
FIG. 1 is a left side view illustrating a motorcycle according to one embodiment of the present invention.

As illustrated in FIG. 1, the motorcycle 1 is what is called a scooter type, and has a body frame 4 forming the framing of the vehicle body. The body frame 4 has a pair of right and left upper frames 5 extending in a front and rear direction, and a pair of right and left lower frames 6 provided below the upper frames 5.

A front fork 7 is supported on a front end portion of the body frame 4, a front wheel 8 is pivotally supported on a low end of the front fork 7, and a front fender 10 is provided so as to cover an upper side of the front wheel 8. A handlebar 11 is provided on an upper end of the front fork 7.

A side stand 12 is supported on a low portion of the body frame 4. On a rear portion of the body frame 4, a front end portion of a power unit 13 is supported, a rear wheel 14 is pivotally supported on a rear end portion of the power unit 13, and a rear fender 15 is provided so as to cover an upper side of the rear wheel 14. The rear portion of the body frame 4 is covered with a body cover 16.

A seat 17 on which the occupant (driver) 2 sits is provided on a rear upper side of the body frame 4, and a passenger's seat 18 on which the occupant (passenger) 3 sits is provided behind the seat 17. A front box 20 is provided in front of the seat 17, and a front box lid 21 is provided on a rear upper portion of the front box 20 to cover an intake port (not illustrated). A pair of right and left footboards 22 (only the footboard 22 on the left side is illustrated in FIG. 1) allowing the occupant 2 to place his or her feet is provided diagonally below and in front of the seat 17, and a pair of right and left passenger's footboards 23 (only the passenger's footboard 23 on the left side is illustrated in FIG. 1) allowing the occupant 3 to place his or her feet is provided behind the footboards 22.

Next, the vicinity of the pair of right and left footboards 22 will be described in detail.

Each footboard 22 is inclined rearward and upward forming a low floor shape. Each footboard 22 is located in an intermediate portion between the seat 17 and the front box 20 in the front and rear direction, and is recessed downward in a side view with respect to the seat 17 and the front box 20. Each footboard 22 forms an elongated shape in the front and rear direction (see FIG. 2).

Figure 3:
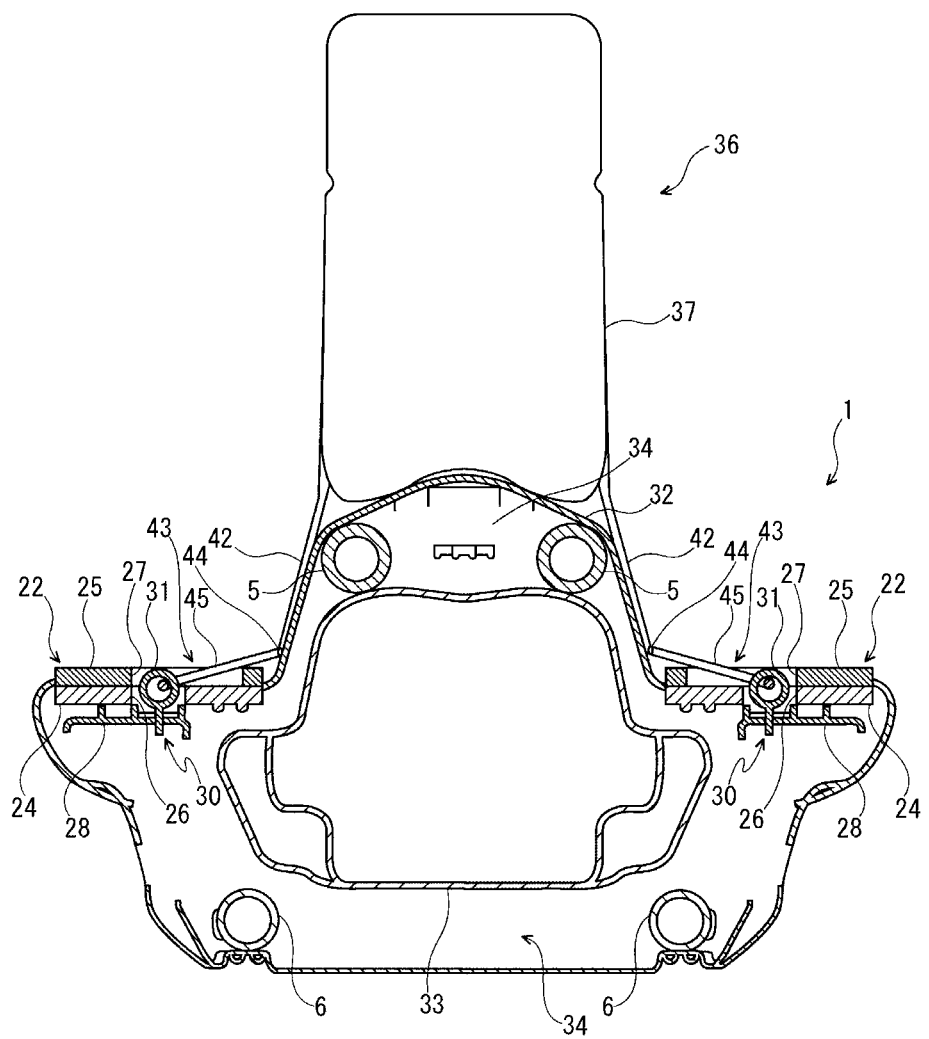
FIG. 3 is an I-I cross-sectional view of FIG. 1 illustrating a state that feet of an occupant are not mounted on footboards in the motorcycle according to one embodiment of the present invention.
Figure 4:
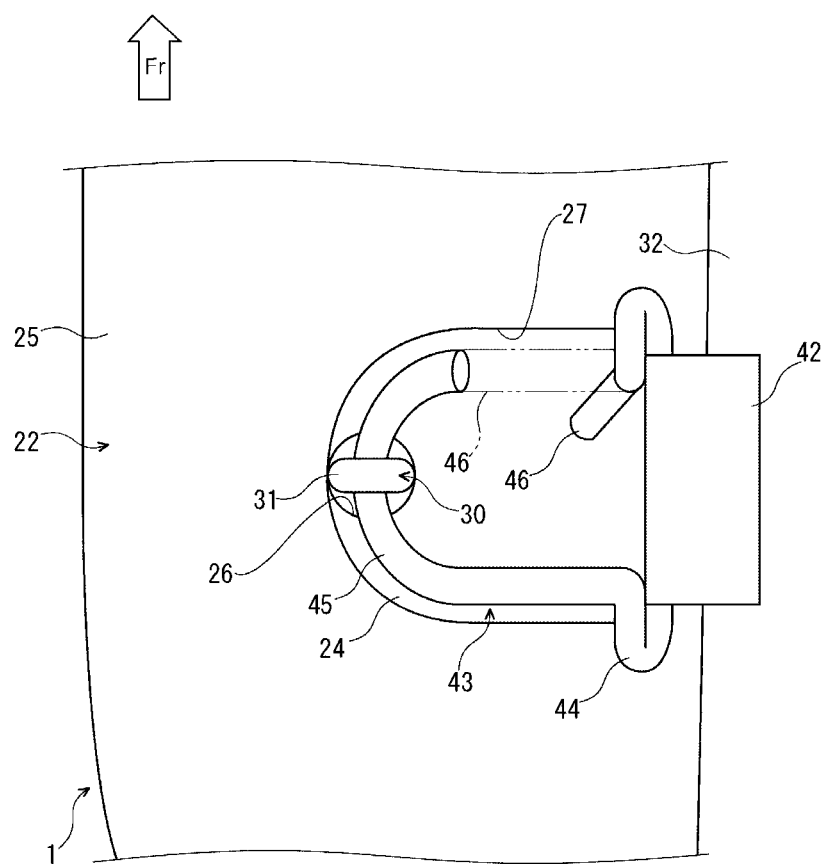
FIG. 4 is a plan view illustrating the vicinity of a footboard in the motorcycle according to one embodiment of the present invention.

As illustrated in FIG. 3, each footboard 22 is constituted of a board body 24 in a plate shape and a mat 25 in a plate shape, which is overlaid on the board body 24. As illustrated in FIG. 4, an insertion hole 26 circular in plan view is formed in a center portion in the right and left direction of the board body 24. Further, an insertion trench 27 communicating with the insertion hole 26 is formed in a portion from the center portion in the right and left direction to an inside portion of the mat 25. The insertion trench 27 has an outside portion curved in a semicircular shape.

Figure 5:
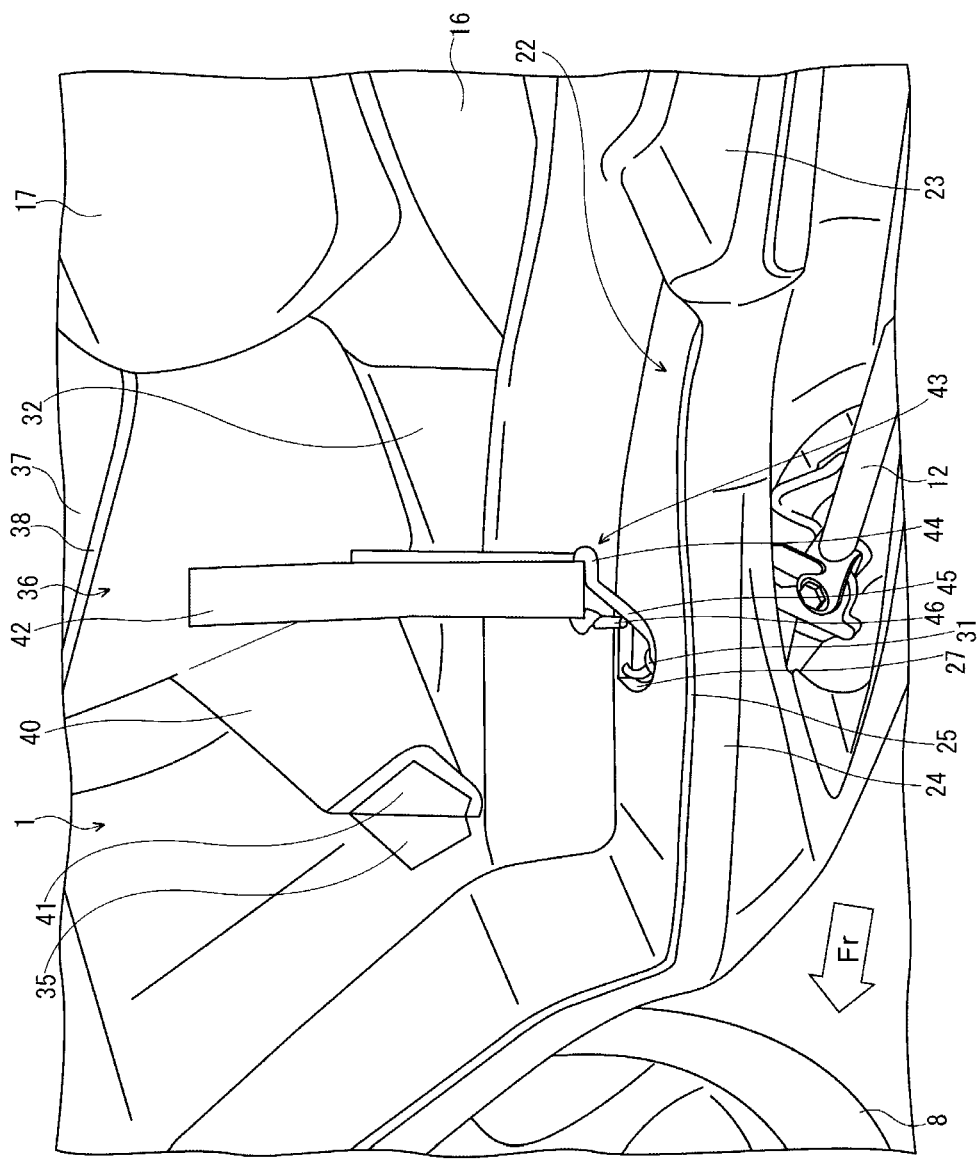
FIG. 5 is a perspective view illustrating the vicinity of the footboard in the motorcycle according to one embodiment of the present invention.

As illustrated in FIG. 3, a frame member 28 is provided under the board body 24, and the footboard 22 is supported on this frame member 28. A body side engagement member 30 is fixed detachably in an inside portion of the frame member 28. The body side engagement member 30 is what is called an eyebolt and has its lower portion attached to the frame member 28, and an annular engagement portion 31 is formed on its upper end. The engagement portion 31 is inserted in the insertion hole 26 of the board body 24 and the insertion trench 27 of the mat 25, and is located to an upper face side of the mat 25 (which also corresponds to an upper face side of the entire footboard 22). An upper edge of the engagement portion 31 is disposed at substantially the same height as the upper face of the mat 25 (which also corresponds to the upper face of the entire footboard 22). As illustrated in FIG. 5, the engagement portion 31 is located in the center in the right and left direction of each footboard 22 and is located on a slightly front side of the center in the front and rear direction of each footboard 22.

As illustrated in FIG. 3, a projecting portion 32 projecting upward is provided in the center in the right and left direction of the vehicle body between the footboards 22, and the engagement portion 31 is disposed beside this projecting portion 32. The projecting portion 32 is supported from an under side by the pair of right and left upper frames 5, and a housing space 34 for housing a fuel tank 33 is formed below the projecting portion 32. As illustrated in FIG. 5, a body side fastener face 35 is formed in a front portion of the projecting portion 32.

To the motorcycle 1 structured as above, a bag 36 as a load can be secured. This bag 36 will be described below.

Figure 2:
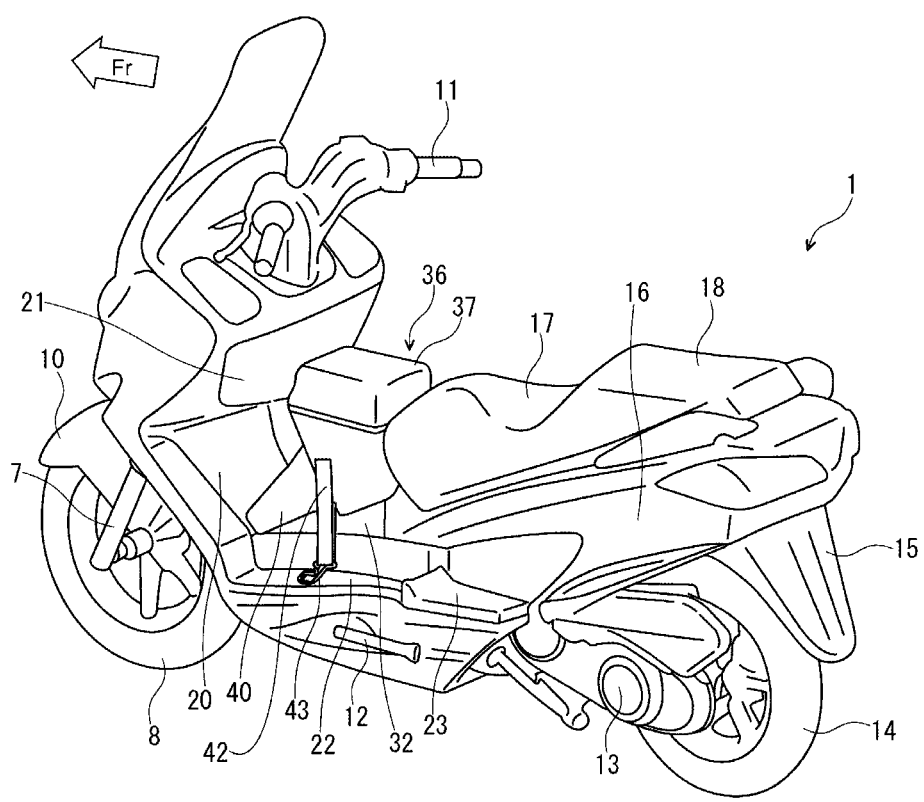
FIG. 2 is a perspective view illustrating the motorcycle according to one embodiment of the present invention.
Figure 6:
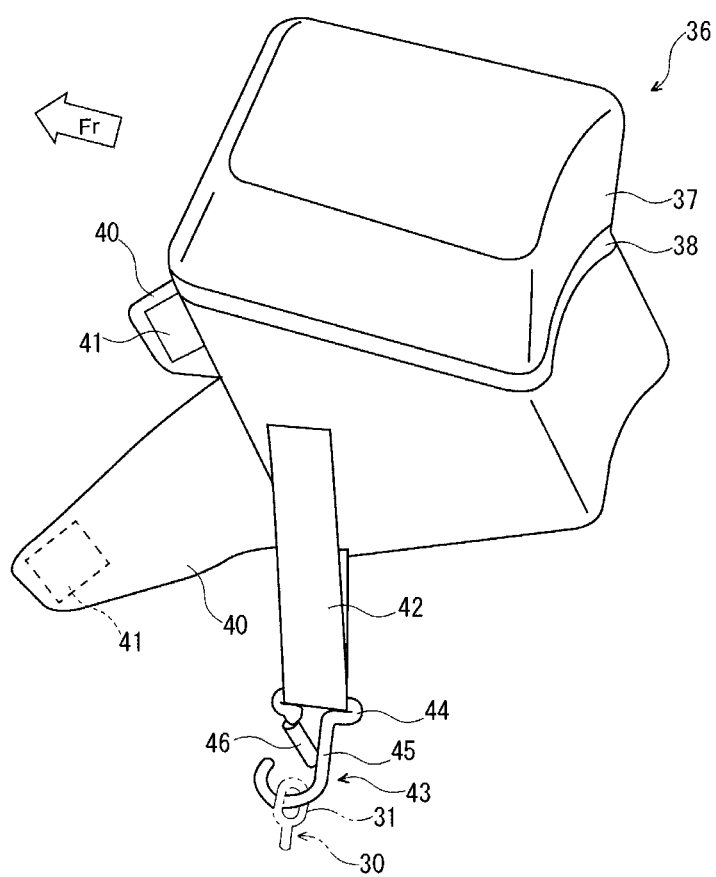
FIG. 6 is a perspective view illustrating a bag fixed to the motorcycle according to one embodiment of the present invention.

As illustrated in FIG. 2, the bag 36 has a bag body 37 in which an item storage space (not illustrated) is formed, and this bag body 37 is mounted on an upper face of the projecting portion 32. As best illustrated in FIG. 6, a bag height adjusting fastener 38 is provided in an upper portion of the bag body 37. A pair of right and left fixing pieces 40 is attached on a front lower portion of the bag body 37. Each fixing piece 40 extends forward and downward, and a bag side fastener face 41 is provided on an inside face of each fixing piece 40. This bag side fastener face 41 is joined detachably to the body side fastener face 35 of the projecting portion (see FIG. 5). Note that FIG. 5 illustrates a state in the course of joining the bag side fastener face 41 to the body side fastener face 35.

As illustrated in FIG. 6, a fixing band 42 is attached on a front portion of each of both right and left side faces of the bag body 37. The fixing band 42 extends downward, and a bag side fixing member 43 is attached to a lower end of the fixing band 42. The bag side fixing member 43 has an attaching portion 44 clamping the lower end of the fixing band 42, a J-shaped hook portion 45 extending downward and outward from one end side of the attaching portion 44 (rear end side in this embodiment), and a fastening portion 46 having a straight bar shape provided on the other end side of the attaching portion 44 (front end side in this embodiment).

The hook portion 45 is engaged detachably with (hooked on) the engagement portion 31 of the body side engagement member 30. As illustrated in FIG. 3, an outside portion of the hook portion 45 is inserted in the insertion trench 27 of the mat 25. On the other hand, an inside portion of the hook portion 45 is slightly exposed to an upper side of the insertion trench 27 of the mat 25. As indicated by two-dot chain lines in FIG. 4, the fastening portion 46 can be engaged with a free end of the hook portion 45 as necessary. That is, the bag side fixing member 43 is what is called a carabiner structure.

In the above-described structure, when the bag 36 is fixed to the motorcycle 1, the bag body 37 is mounted on the projecting portion 32 of the motorcycle 1, and the hook portion 45 of each bag side fixing member 43 is engaged with (hooked on) the engagement portion 31 of each body side engagement member 30, and the bag side fastener face 41 is joined to the body side fastener face 35. Thus, as illustrated in FIG. 1, the bag 36 is fixed at a position sandwiched by legs 49 of the occupant 2 between the seat 17 and the front box 20.

Figure 7:
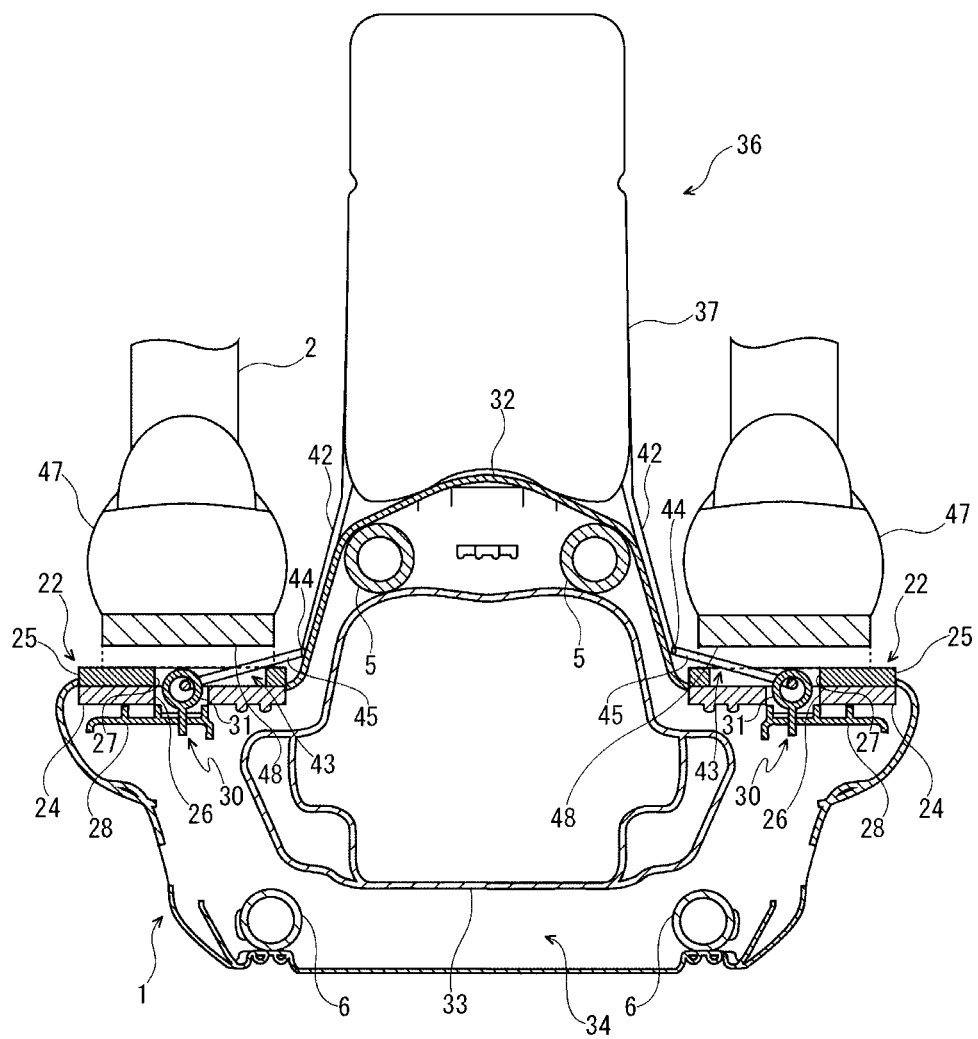
FIG. 7 is an I-I cross-sectional view of FIG. 1 illustrating a state that the feet of the occupant are placed on the footboards in the motorcycle according to one embodiment of the present invention.

When the bag 36 is fixed thus to the motorcycle 1, as illustrated in FIG. 3, the fixing bands 42 of the bag 36 are disposed along side faces of the projecting portion 32. Further, as illustrated in FIG. 7, when the feet 47 of the occupant 2 are placed on the footboards 22 in a state that the bag 36 is fixed to the motorcycle 1, the engagement portions 31 and the bag side fixing members 43 are located immediately below plantar arches 48 of the feet 47 of the occupant 2 (corresponding to the vicinities of the plantar arches 48 of the feet 47 of the occupant 2). Note that if the fixing bands 42 move in this state, the hook portions 45 are locked by the feet 47 of the occupant 2 to restrict floating of the hook portions 45. Thus, a positional displacement or the like of the fixing bands 42 is difficult to occur, and the fixing state of the bag 36 can be maintained securely.

In this embodiment, the engagement portions 31 for fixing the bag 36 are provided on the upper face sides of the footboards 22, and thus the operator who performs an operation of mounting or dismounting the bag 36 from above can easily see the engagement portions 31, as compared to the case where the engagement portions 31 are provided on sides of the footboards 22. Thus, workability in operation of mounting or dismounting the bag 36 can be increased.

Further, since it is structured to hook the hook portion 45 of the bag side fixing member 43 attached to each fixing band 42 to the engagement portion 31 of the body side engagement member 30, the fixing band 42 need not be tied on the motorcycle body, and thus the operation of mounting or dismounting the bag 36 becomes much easier. Further, since the surrounding of the engagement portion 31 is guided by the board body 24, a problem of positional displacement or the like of the engagement portion 31 is difficult to occur even if the feet 47 of the occupant 2 come in contact with the engagement portion 31.

Further, when the projecting portion 32 is provided between the footboards 22 as in this embodiment, if the engagement portions 31 are provided on the sides of the footboards 22, the fixing bands 42 coupling the bag body 37 mounted on the projecting portion 32 and the bag side fixing members 43 traverse above the footboards 22. Accordingly, it is difficult for the occupant 2 to place his or her feet 47 on the footboards 22, and there is a concern that riding comfort is impaired. However, in this embodiment, since the engagement portions 31 are provided in the respective centers in the right and left direction of the footboards 22, the fixing bands 42 do not traverse above the footboards 22, and there is no concern that riding comfort is impaired by the fixing bands 42. Note that when easiness of placing the feet 47 of the occupant 2 on the footboards 22 is considered, it is preferred that each engagement portions 31 be provided in a center portion in the right and left direction of the footboard 22 or provided more inside than the center portion in the right and left direction.

Further, by inserting each engagement portion 31 in the insertion hole 26 of the board body 24 and the insertion trench 27 of the mat 25, the upper edge of the engagement portion 31 is disposed at substantially the same height as an upper face of the mat 25, and the engagement portion 31 is not exposed above the mat 25 (see FIG. 3). Accordingly, in the case where the engagement portions 31 are not used, or the like, the feet 47 of the occupant 2 would not be caught on the engagement portions 31, and the riding comfort of the motorcycle 1 improves. Further, since not only the engagement portion 31 but also the outside portion of the hook portion 45 of the bag side fixing member 43 is inserted in the insertion trench 27, it is difficult for the feet 47 of the occupant 2 to be caught on the bag side fixing members 43, and thus the riding comfort of the motorcycle 1 improves further.

Moreover, since the engagement portions 31 are located immediately below the plantar arches 48 of the feet 47 of the occupant 2 in a state that the occupant 2 places his or her feet 47 on the footboards 22, contact of the feet 47 of the occupant 2 with the engagement portions 31 is suppressed, and it is possible to alleviate the sense of discomfort during riding. Further, in a state that the occupant 2 places his or her feet 47 on the footboards 22, not only the engagement portions 31 but also the most parts of the bag side fixing members 43 are located immediately below the plantar arches 48 of the feet 47 of the occupant 2, and hence contact of the feet 47 of the occupant 2 with the bag side fixing members 43 can be prevented. Accordingly, it is possible to further alleviate the sense of discomfort during riding.

Figure 8:
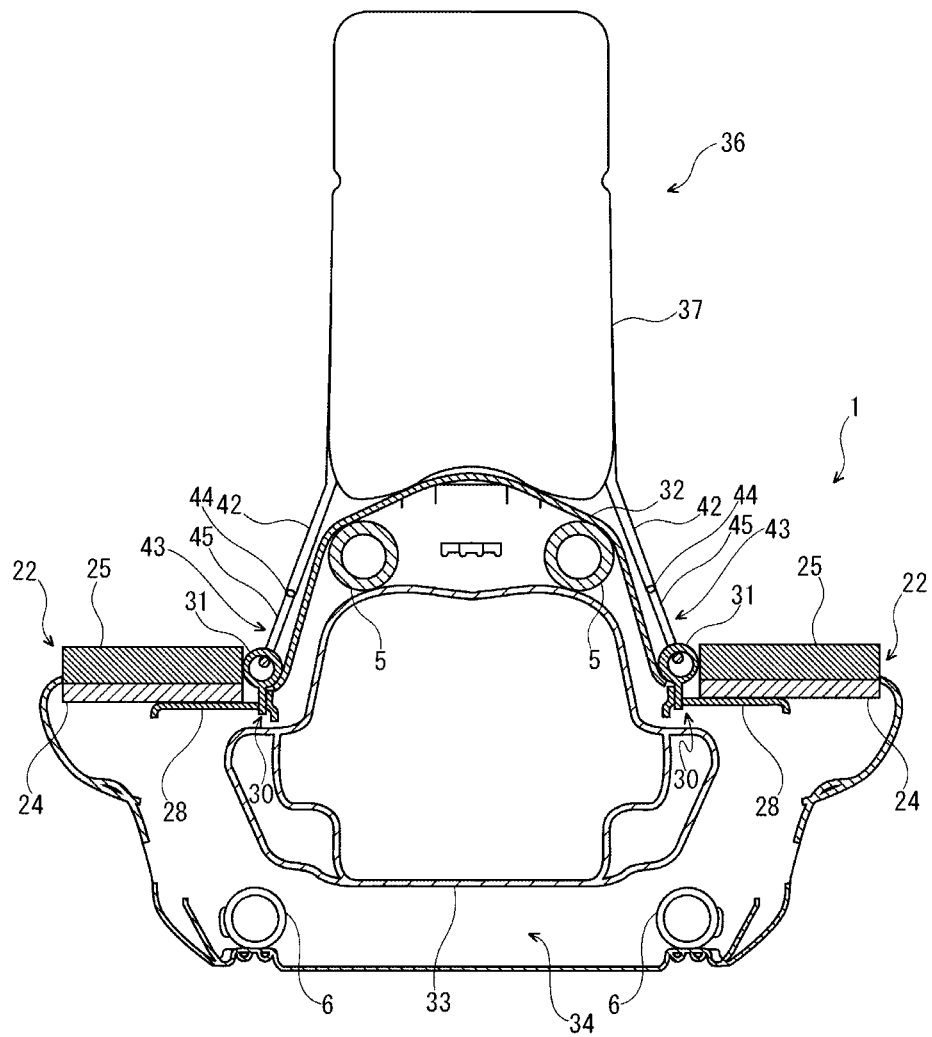
FIG. 8 is a cross-sectional view illustrating a motorcycle according to another different embodiment.

The case where each engagement portion 31 is disposed in the center portion in the right and left direction of the footboard 22 has been described in this embodiment, but in another different embodiment, the engagement portion 31 may be provided in an inside end portion of each footboard 22 to make it close to the projecting portion 32, as illustrated in FIG. 8. By employing such a structure, the engagement portions 31 can be made close to the projecting portion 32, and thus the fixing bands 42 run along the projecting portion 32. Accordingly, the feet 47 of the occupant 2 would not be caught on the fixing bands 42, and the bag side fixing members 43 and the engagement portions 31 are not pressed down with the feet 47, which improves the riding comfort.

The case where each body side engagement member 30 is fixed to the frame member 28 located under the footboard 22 has been described in this embodiment, but in another different embodiment, the body side engagement member 30 may be fixed to the frame member 28 located inside the projecting portion 32, thereby disposing the engagement portion 31 along the side face of the projecting portion 32. That is, "the upper face side of the footboard 22" need not always be in contact with the footboard 22 as long as it is not a lateral side or lower side of the footboard 22.

The body side engagement member 30 is detachable from the frame member 28 in this embodiment, but in another different embodiment, the body side engagement member 30 may be non-detachable from the frame member 28. The case where each annular engagement portion 31 is provided on the upper end of the body side engagement member 30 to be fixed to the frame member 28 has been described in this embodiment, but in another different embodiment, the engagement portion 31 may be formed of a hook (not illustrated) to be fixed to the frame member 28, or the engagement portion 31 may be formed by deforming a part of the frame member 28.

The case where each footboard 22 is formed of the board body 24 and the mat 25 has been described in this embodiment, but in another different embodiment, the footboard 22 may be formed only of the board body 24. In this case, the same operation and effect as those in this embodiment can be exhibited by providing the insertion trench 27 in the upper face of the board body 24.

The case where the upper edge of the engagement portion 31 is disposed at substantially the same height as the upper face of the mat 25 has been described in this embodiment, but in another different embodiment, the upper edge of the engagement portion 31 may be disposed at a position lower than the upper face of the mat 25. In this case, catching of the foot 47 of the occupant 2 on the engagement portion 31 can be prevented more effectively.

Although it is neither illustrated nor described in this embodiment, when the engagement portion 31 is not in use, it is preferred that the insertion trench 27 be covered with a cover (not illustrated) which covers the engagement portion 31. By employing such a structure, the engagement portion 31 can be hidden when not in use, which improves its appearance, and clogging of foreign matters such as sands or dirt in the insertion hole 26 or the insertion trench 27 is prevented, which improves component durability. Further, it is preferred that the above-described cover be formed integrally with the mat 25, and by employing such a structure, losing of the cover can be prevented.

The case where part of the bag side fixing member (outside part of the hook portion 45) is inserted in the insertion trench 27 of the mat 25 has been described in this embodiment, but in another different embodiment, the entire bag side fixing member 43 may be inserted in the insertion trench 27.

The case where both the fastener mechanism (see the body side fastener face 35 and the bag side fastener face 41) and the hook mechanism (see the engagement portion 31 and the hook portion 45) are used to fix the bag 36 securely to the motorcycle 1 has been described in this embodiment. On the other hand, in another different embodiment, a load such as a bag may be fixed to the motorcycle 1 by using only the hook mechanism.

The case where the structure of the present invention is applied to the motorcycle 1 of scooter type has been described in this embodiment, but in another different embodiment, the structure of the present invention may be applied to another different straddle type vehicle such as an electric wheel chair, an off-road traveling vehicle, a personal water craft, or the like.

According to the present invention, it is possible to increase workability in operation of mounting or dismounting a load on a vehicle body by making the engagement portions for fixing a load easily viewable.

It should be noted that the above embodiments merely illustrate concrete examples of implementing the present invention, and the technical scope of the present invention is not to be construed in a restrictive manner by these embodiments. That is, the present invention may be implemented in various forms without departing from the technical spirit or main features thereof.

What is claimed is:

1. A straddle type vehicle comprising:
    a seat,
    a pair of right and left footboards formed in a plate shape extending in the front and rear direction, which is provided diagonally below and in front of the seat and allowing an occupant to place his or her feet thereon,
    insertion holes formed in each of the footboards,
    a body frame extending in a front and rear direction below the seat,
    a projecting portion provided between the footboards and projecting upward from a right side and a left side of the straddle type vehicle and over the body frame,
    an engagement portion fixing a detachable load mounted on the projecting portion is provided outside and beside the projecting portion and is disposed at an upper face of each of the footboards and the engagement portions are inserted in the insertion holes.

2. The straddle type vehicle according to claim 1, wherein an upper edge of the engagement portion is disposed at a position which is at a same height as upper most faces of the footboards or lower than the upper most faces of the footboards.

3. The straddle type vehicle according to claim 1, wherein the engagement portion is positioned in front of a front end portion of the seat and on a slightly front side of the center in a front and rear direction of the footboards at the upper face of the footboards.

4. The straddle type vehicle according to claim 1, wherein the engagement portion is provided on an inside end portion of each of the footboards and is adjacent to an outside edge of the projecting portion.

5. The straddle type vehicle according to claim 1, wherein the engagement portion and the footboards are overlapped in a plan view.

6. The straddle type vehicle according to claim 1, wherein a housing space is formed below the projecting portion.

7. The straddle type vehicle according to claim 1,
    wherein the insertion holes are approximately centered in a lateral dimension of the footboards, and further comprising:
    insertion trenches, formed in an upper face of the footboards, wherein the insertion trenches communicate with the insertion holes.

8. The straddle type vehicle according to claim 7, wherein each of the insertion trenches is formed laterally inward from an approximate position of the insertion holes toward a centerline of the straddle type vehicle.

* * * * *